(12) United States Patent
Zocholl

(10) Patent No.: US 7,161,778 B2
(45) Date of Patent: Jan. 9, 2007

(54) ROTOR THERMAL MODEL FOR USE IN MOTOR PROTECTION

(75) Inventor: Stanley E. Zocholl, Holland, PA (US)

(73) Assignee: Schweltzer Engineering Laboratories, Inc., Pullman, WA (US)

( * ) Notice: Subject to any disclaimer, the term of this patent is extended or adjusted under 35 U.S.C. 154(b) by 398 days.

(21) Appl. No.: 10/607,804

(22) Filed: Jun. 26, 2003

(65) Prior Publication Data

US 2004/0264073 A1    Dec. 30, 2004

(51) Int. Cl.
    *H02H 7/08* (2006.01)
(52) U.S. Cl. .................................................. 361/25
(58) Field of Classification Search ............. 361/23, 361/25
    See application file for complete search history.

(56) References Cited

U.S. PATENT DOCUMENTS

| | | | |
|---|---|---|---|
| 4,544,982 A * | 10/1985 | Boothman et al. | 361/96 |
| 4,914,386 A * | 4/1990 | Zocholl | 324/772 |
| 5,436,784 A * | 7/1995 | Schweitzer et al. | 361/25 |
| 5,644,510 A * | 7/1997 | Weir | 702/132 |
| 5,684,342 A * | 11/1997 | Innes et al. | 307/117 |
| 5,761,018 A * | 6/1998 | Blakely | 361/23 |
| 5,856,903 A * | 1/1999 | Smith | 361/96 |
| 5,872,722 A * | 2/1999 | Oravetz et al. | 700/292 |

* cited by examiner

*Primary Examiner*—Brian Sircus
*Assistant Examiner*—Boris Benenson
(74) *Attorney, Agent, or Firm*—Cook, Alex, McFarron, Manzo, Cummings & Mehler Ltd.

(57) ABSTRACT

The protective relay for an induction motor includes a first program function which establishes a first thermal threshold value for a start condition of the motor, using a start condition thermal model. The thermal condition of the motor is determined by measuring the motor's thermal response to stimulus. A comparator compares the start condition thermal representation with the first thermal threshold value and monitors whether the first thermal threshold value is exceeded by the start condition thermal representation. A second thermal threshold value is established for a run condition of the motor, including a selected time constant which results in the time-current curves of the start and run conditions being substantially continuous. A representation of the thermal condition of the motor is then developed in response to stimulus current. A comparator then compares the run condition thermal representation with the second thermal threshold value.

3 Claims, 2 Drawing Sheets

STARTING STATE 1 >2.5 PU

RUNNING STATE 1 <2.5 PU

ROTOR THERMAL MODEL FOR USE IN MOTOR PROTECTION

TECHNICAL FIELD

This invention relates generally to temperature protection for induction motors, and more specifically concerns a system using thermal models for the protection of motors.

BACKGROUND OF THE INVENTION

U.S. Pat. No. 5,436,784, owned by the assignee of the present invention, discloses the use of thermal models to determine when an overload condition has been reached relative to calculated temperatures in the motor. The contents of the '784 patent are hereby incorporated by reference. The thermal models include one model for a start condition of the motor, defined as when the measured rotor current is relatively high, specifically, greater than 2.5 times the full load rated motor current, and a second model for a run condition of the motor, i.e. when the motor is at rated speed, defined as when the rotor current is less than 2.5 times the maximum rated current.

The thermal models are determined using values of full-load motor current, locked rotor current, and locked rotor thermal time, which are available from the manufacturer. Threshold values of temperature are established for both conditions (both thermal models), again using the manufacturer's information. The thermal models include a representation of the heating effect in the rotor, a representation of the thermal capacity of the rotor (the product of the specific heat of the body being heated times the mass of the body), and a cooling effect present in the rotor, i.e. the ability of the motor to give off heat during operation.

FIG. 1 shows a known electrical analog of the thermal model approach for a "start" condition of the motor, while FIG. 2 shows a known electrical analog for a "run" condition. In the figures, $R_1$ refers to the locked rotor electrical resistance (in ohms), $R_0$ refers to the running motor electrical resistance, $I_L$ refers to the locked rotor current, $T_a$ refers to the locked rotor time with the motor initially at ambient temperature, $T_0$ refers to the locked rotor time with the motor initially at an operating temperature, while TD refers to a time dial number needed to reach the trip temperature, and SF refers to a "service factor" value, i.e. a threshold value.

In the thermal model arrangement disclosed in the '784 patent, the run condition time-current curve did not match the time-current curve of the start condition, resulting in less than optimum protection for the motor, due to either the rotor or the starter being individually the limiting factor in the protection, instead of both having equal effect. The curves can be matched, i.e. made continuous, by a time constant which relates starter condition to the rotor condition, but often, the time constant, although usually known to the manufacturer, is not made available to the motor customers.

In such cases, a time constant must be determined and then added to the thermal protection calculation, but it may not be accurate, which results in less than optimum protection performance. One example is cyclical loads to the motor, where the temperature in the motor may regularly rise above a conventional threshold temperature but the cyclical nature of the load does not result in a true temperature overload appropriate for a tripping action. With an incorrect or less than optimum time constant, a trip may occur which is unnecessary.

In this invention, a time constant is calculated which in fact does remove the discontinuity between the time-current curves of the start condition and run condition thermal models, resulting in a continuous time-current curve which in turn results in improved protection, decreasing unwarranted tripping actions.

DISCLOSURE OF THE INVENTION

Accordingly, the invention is a protective relay for an induction motor, having known operating parameters including known overload thermal current limits, comprising: a circuit for measuring the input current to the motor; a first program function for establishing a first thermal threshold value for a start condition of the motor; means for determining a representation of the thermal condition of the motor during the start condition thereof; a comparing element for comparing the start condition thermal representation with said first thermal threshold value and for producing an output signal when said first thermal threshold value is exceeded by said start condition thermal representation; a circuit for establishing a second thermal threshold value for a run condition of the motor, the second thermal threshold value being different from the first thermal threshold value and including a selected time constant which results in time-current curves of the start and run conditions being substantially continuous; means for determining a representation of the thermal condition of the motor during the run condition thereof; and a comparator for comparing the run condition thermal representation with said second thermal threshold value and for producing an output signal when said second thermal threshold is exceeded by said run condition thermal representation.

BEST MODE FOR CARRYING OUT THE INVENTION

Figure 1:
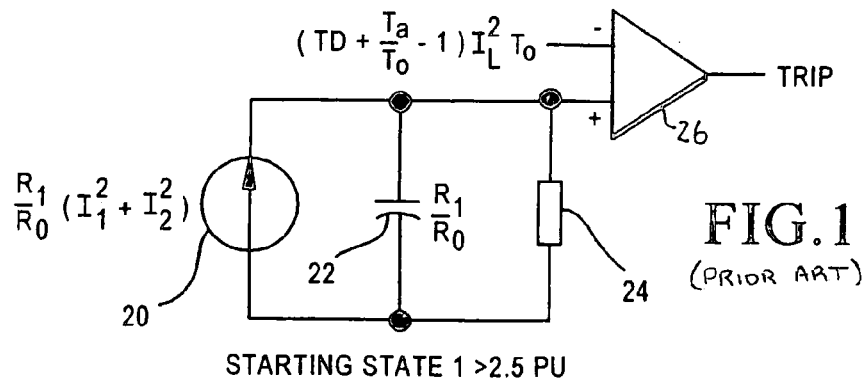
FIGS. 1 and 2 are prior art electrical analogs for start and run conditions for a rotor thermal model for motors.
Figure 2:
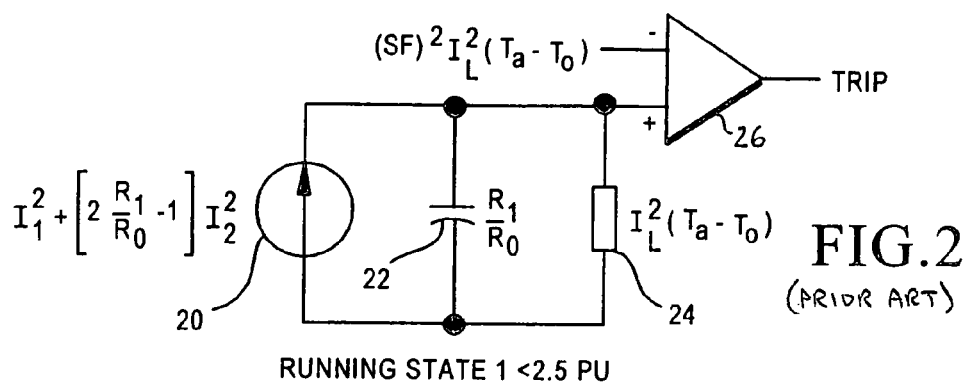

As indicated above, the use of start and run condition thermal models to provide protection for motors based on the actual heating and cooling of the motor during operation is known. The electrical analog representations of the start and run conditions are briefly discussed above and discussed in some detail in the '784 patent, and are shown in FIGS. 1 and 2. Again, the start condition of the motor is when the measured current to the motor (I) is greater than 2.5 times the full load current, while the run condition of the motor is defined as when the measured current is less than 2.5 times the full load current. The full load current ("FLC") value is supplied by the manufacturer.

The heating effect of the motor in FIGS. 1 and 2 is represented at 20, the thermal capacity at 22 and the cooling effect at 24 (zero for the start condition). The combined result is compared against a threshold value by comparator 26 and a trip decision is made.

Figure 3:
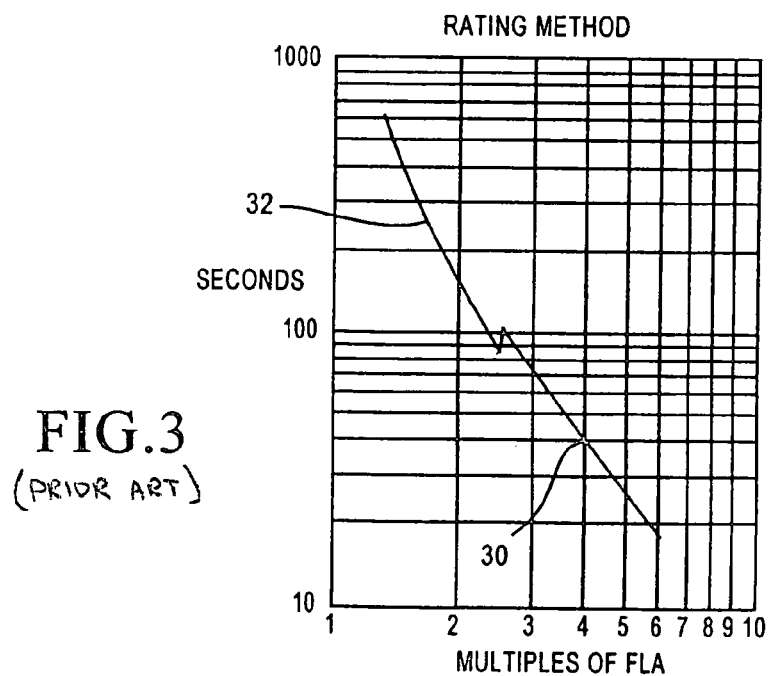
FIG. 3 is a prior art time-current curve showing a discontinuity between start and run conditions.

Each of those thermal model has a time-current curve, which when combined is discontinuous. FIG. 3 shows the discontinuity between the start condition time-current curve 30 and the run condition time-current curve 32.

The time-current curves are produced by equations representing the start and run states of the motor. In the present invention, the same equation is used for the start condition time-current curve:

$$\frac{TD \cdot I_{L2} \cdot T_a - U_o}{I^2}$$

where T=time, TD=a time dial number to the trip temperature, $I_2$=locked rotor current, $T_a$=locked rotor time with motor initially at ambient temperature, and $U_0$=the initial (present) temperature of the motor.

A new run condition time/current curve equation is used, however, to match the two curves.

$$t = TC \cdot \ln\left(\frac{I^2 - U_0}{I^2 - (SF)^2}\right)$$

where TC=a time constant, I=the measured motor current, and $U_0$ is equal to the initial temperature of the motor. Further, TC equals:

$$TC = TDR \cdot \frac{R_1}{R_0} \cdot I_L^2 (Ta - To)$$

where $T_0$=locked rotor time with motor initially at operating temperature. Further, to complete the above equation, the value TDR equals:

$$TDR = \frac{1}{\frac{R_1}{R_0} \cdot 6.25} \cdot \frac{Ta}{Ta - To} \cdot \frac{TD}{\ln\left(\frac{6.25}{6.25 - (SF)^2}\right)}$$

$$= \frac{1}{18.75} \cdot \frac{Ta}{Ta - To} \cdot \frac{TD}{\ln\left(\frac{6.25}{6.25 - (SF)^2}\right)}$$

where SF is the threshold value in terms of current. The value 6.25 is $(2.5)^2$; 2.5 being the value of current where the start and run models meet. This time constant (TC) results in the two curves meeting and being continuous.

Figure 4:
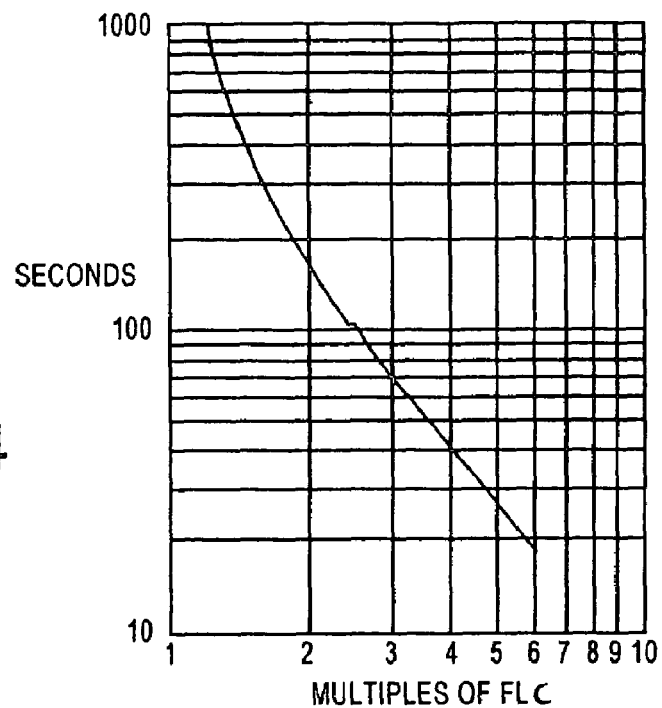
FIG. 4 is a time-current curve showing a continuous curve using the present invention.
Figure 5:
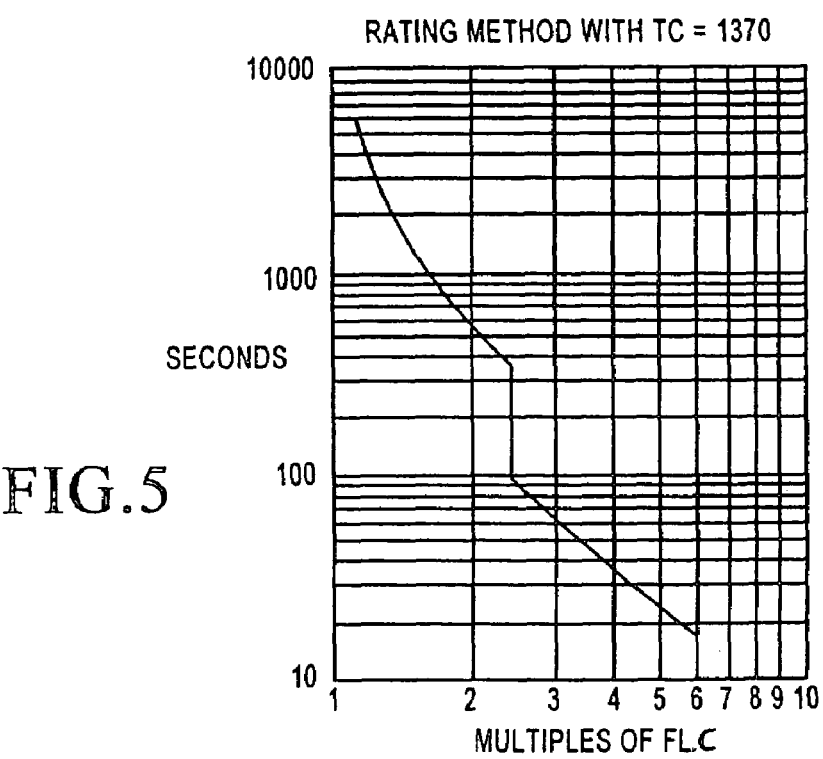
FIG. 5 is a time-current curve with a time constant of 1370 seconds.

FIG. 4 shows the time/current curve using the time constant discussed above. Using this calculated time constant, the equations for the thermal model and the start model produce a continuous curve. In such a case, neither the rotor nor the stator becomes the lead factor relative to the protection (the trip action). They both have equal impact. Further, still using the run condition equation, the user can insert a time constant from the manufacturer, if known. An example of a time-current curve using a time constant of 1370 seconds is shown. The resulting time-current curve is shown in FIG. 5.

The above invention can accommodate cyclic loads. This can be done for a specific motor by choosing a time constant which produces a curve which fits the service factor (SF), i.e. the threshold value for the run condition for that motor. The invention thus permits the time-current curve to be fitted to the service factor of a particular motor.

Although a preferred embodiment of the invention has been disclosed here for purposes of illustration, it should be understood that various changes, modifications and substitutions may be incorporated into the embodiment without departing from the spirit of the invention, which is defined by the claims which follow.

What is claimed is:

1. A protective relay for an induction motor, having known operating parameters including known overload thermal current limits, comprising:
   a circuit for measuring the input current to the motor;
   a first program function for establishing a first thermal threshold value for a start condition of the motor;
   means for determining a representation of the thermal condition of the motor during the start condition thereof;
   a comparator for comparing the start condition thermal representation with said first thermal threshold value and for producing an output signal when said first thermal threshold value is exceeded by said start condition thermal representation;
   a circuit for establishing a second thermal threshold value for a run condition of the motor, the second thermal threshold value being different from the first thermal threshold value, wherein the circuit for establishing a second thermal threshold value includes a selected time constant which is used to calculate a time-current curve combining the start and run time-current curves resulting in a substantially continuous time-current curve;
   means for determining a representation of the thermal condition of the motor during the run condition thereof; and
   a comparator for comparing the run condition thermal representation with said second thermal threshold value and for producing an output signal when said second thermal threshold is exceeded by said run condition thermal representation.

2. A system of claim 1, wherein the protective relay allows the user to set the time constant for a particular motor.

3. A system of claim 1, wherein the time constant is calculated using the equation:

$$TDR\left[\frac{R_1}{R_o} \cdot I_L^2 (T_a - T_o)\right]$$

where $$TDR = \frac{1}{\frac{R_1}{R} \cdot 6.25} \cdot \frac{T_a}{T_a - T_o} \cdot \frac{TD}{\ln\left[\frac{6.25}{6.25 \cdot (SF)^2}\right]}$$

and $R_1$ = locked rotor electrical resistance $R_o$ = running rotor electrical resistance $I_L$ = locked rotor current $T_a$ = locked rotor time with motor initially at constant temperature $T_o$ = locked rotor time with motor initially at operating temperature $TD$ = the time needed to reach trip temperature $SF$ = service factor (threshold temperature)

* * * * *

UNITED STATES PATENT AND TRADEMARK OFFICE
CERTIFICATE OF CORRECTION

PATENT NO. : 7,161,778 B2 Page 1 of 1
APPLICATION NO. : 10/607804
DATED : January 9, 2007
INVENTOR(S) : Stanley Zocholl It is certified that error appears in the above-identified patent and that said Letters Patent is hereby corrected as shown below:

On the Title Page (73) delete "Schweltzer" and insert therefor -- Schweitzer --.

Signed and Sealed this

Tenth Day of April, 2007

JON W. DUDAS
*Director of the United States Patent and Trademark Office*